United States Patent [19]

Wallace et al.

[11] 4,412,860
[45] Nov. 1, 1983

[54] PROCESS FOR RECOVERING NIOBIUM FROM URANIUM-NIOBIUM ALLOYS

[75] Inventors: Steven A. Wallace, Knoxville; Edward T. Creech; Walter G. Northcutt, both of Oak Ridge, all of Tenn.

[73] Assignee: The United States of America as represented by the U.S. Department of Energy, Washington, D.C.

[21] Appl. No.: 425,141

[22] Filed: Sep. 27, 1982

[51] Int. Cl.³ .............................................. C22B 34/24
[52] U.S. Cl. .................................. 75/84; 75/84.1 R; 423/5; 423/20; 252/627
[58] Field of Search ..................... 423/5, 20; 252/627; 75/84, 84.1 R, 84.1 A

[56] References Cited

U.S. PATENT DOCUMENTS

| | | | |
|---|---|---|---|
| 2,778,730 | 1/1957 | Spedding et al. | 75/84.1 R |
| 2,818,330 | 12/1957 | Beatty et al. | 75/84.1 R |
| 2,963,361 | 12/1960 | Teitel | 75/84.1 R |
| 3,841,863 | 10/1974 | Caldwell et al. | 423/5 X |
| 3,843,765 | 10/1974 | Anderson et al. | 423/5 X |

Primary Examiner—Deborah L. Kyle
Assistant Examiner—Matthew A. Thexton
Attorney, Agent, or Firm—Edwin D. Grant; Stephen D. Hamel; Richard G. Besha

[57] ABSTRACT

Niobium is recovered from scrap uranium-niobium alloy by melting the scrap with tin, solidifying the billet thus formed, heating the billet to combine niobium with tin therein, placing the billet in hydrochloric acid to dissolve the uranium and leave an insoluble residue of niobium stannide, then separating the niobium stannide from the acid.

5 Claims, 3 Drawing Figures

PROCESS FOR RECOVERING NIOBIUM FROM URANIUM-NIOBIUM ALLOYS

BACKGROUND OF THE INVENTION

This invention, which resulted from a contract with the United States Department of Energy, relates to a process for recovering niobium from uranium-niobium alloys.

Applications for uranium are limited by the corrosion susceptibility and relatively low strength of the metal. However, uranium-niobium alloys are corrosion resistant and relatively strong, and these alloys are consequently frequently substituted for uranium in the nuclear industry. Since niobium is expensive, a process is needed for recovering it from the machining scrap of uranium-niobium alloys.

SUMMARY OF THE INVENTION

It is therefore the object of this invention to provide an effective process for recovering niobium from scrap formed of uranium-niobium alloys.

In accordance with the invention, this object is accomplished by the following process steps: melting tin and a uranium-niobium alloy to disperse the tin in the alloy; solidifying the melted tin and uranium-niobium alloy to form a billet; heating said billet to combine niobium in the billet with tin; placing said billet in hydrochloric acid to dissolve uranium in the billet in the acid and leave an insoluble residue of niobium stannide; and separating said niobium stannide from said acid.

DETAILED DESCRIPTION OF THE PROCESS OF THE INVENTION

The development is a process for recovering niobium from uranium-niobium alloys in which stoichiometric equivalents of tin for the niobium are dispersed around the grains of the alloy in melting and casting operations. The niobium in the alloy is reduced in situ with the tin to $Nb_6Sn_2H_2$ or $Nb_3Sn$ by annealing the billet at 800° C. for one hour and water quenching followed by heating to 600° C. for four hours. The uranium in the billet is dissolved in hydrochloric acid, leaving an insoluble hydride of niobium stannide. Eighty percent of the niobium in the alloy billet is recovered as niobium stannide, an intermetallic compound with superconducting characteristics. In one demonstration of the invention, 1000 grams of uranium-niobium alloy containing about six wt.% niobium were mechanically mixed with 26 grams of tin. The mixture of the tin and uranium-niobium alloy was vigorously melted in an electric arc furnace, then cast into a billet. The billet was annealed at a temperature of 800° C. for one hour and water-quenched. An electron microprobe analysis of the billet indicated that approximately 40% of the niobium in the alloy had reacted in situ with the dispersed tin to form the intermetallic compound of niobium stannide.

Figure 1:
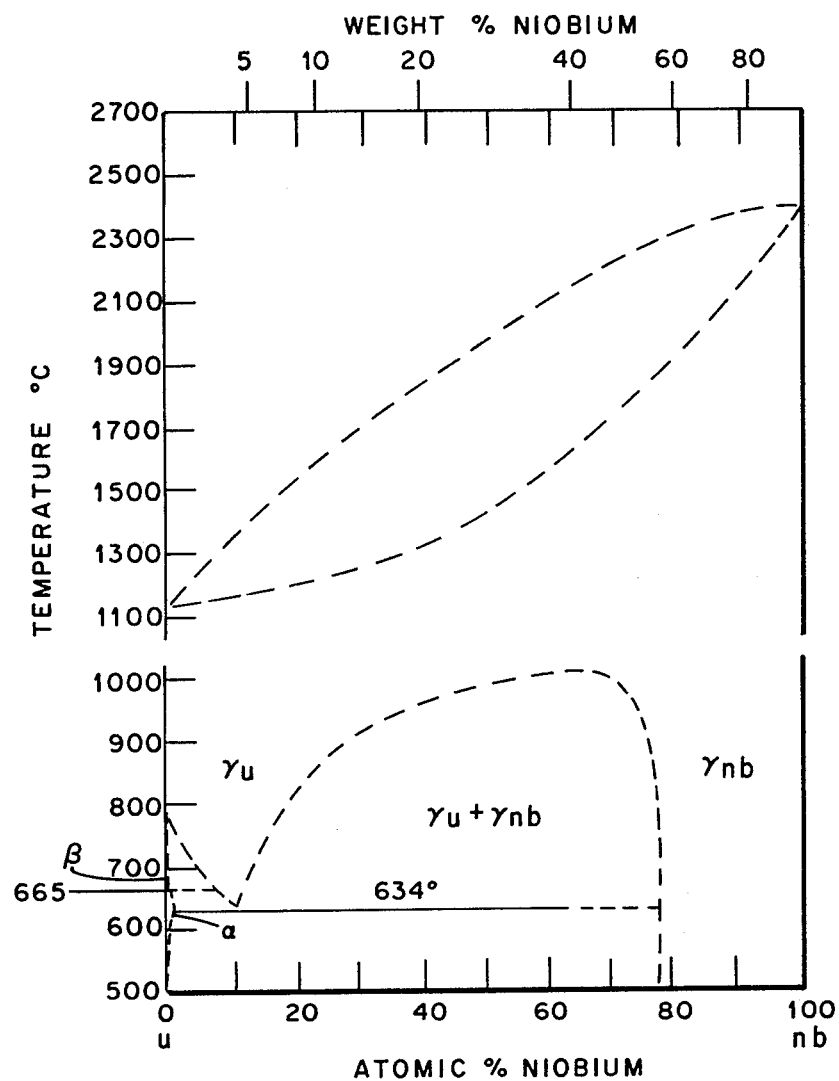
FIG. 1 is a uranium-niobium phase diagram.
Figure 2:
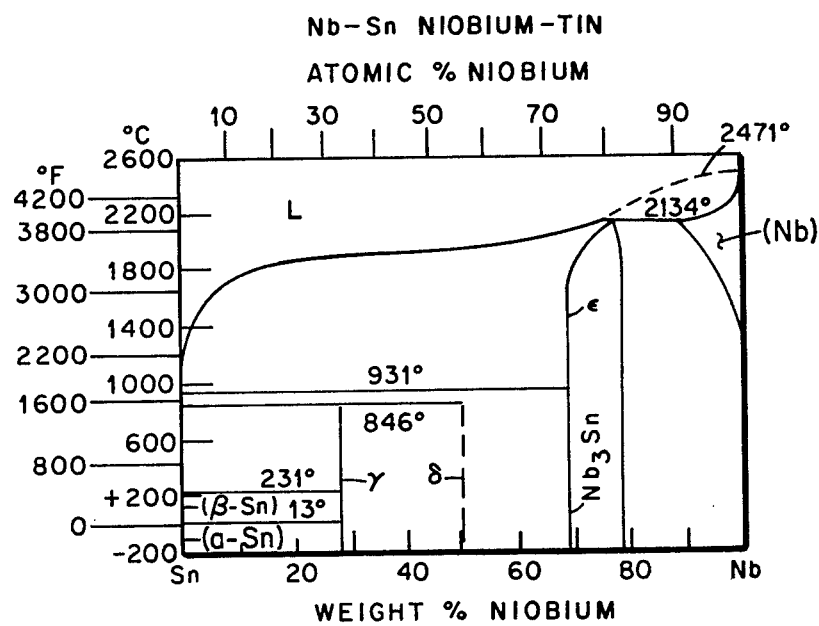
FIG. 2 is a niobium-tin phase diagram.
Figure 3:
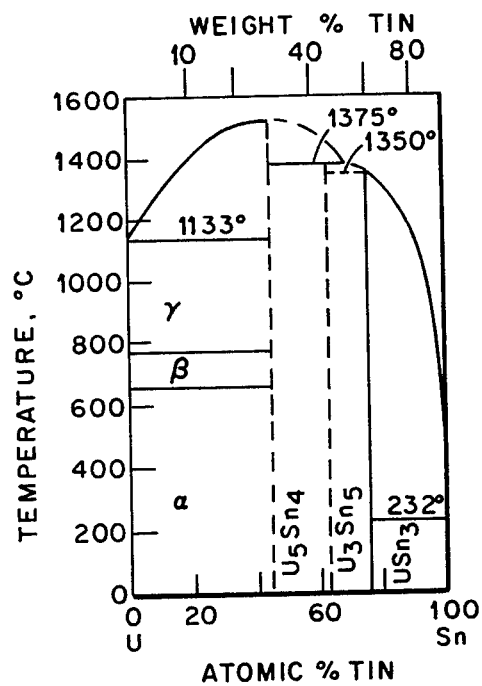
FIG. 3 is a uranium-tin phase diagram.

In additional experiments, four pieces from the annealed billet were subjected to annealing treatments at 600° C. for one, two, four, and eight hours, then dissolved in hydrochloric acid. The niobium recovery from the solution of the hydrochloric acid was 80% for the pieces annealed four and eight hours. The residue of the billet in the solution of hydrochloric acid was hydrided niobium stannide ($Nb_6Sn_2H_2$). This product is easily converted by conventional chemical techniques to niobium stannide ($Nb_3Sn$), an intermetallic compound with superconducting characteristics which makes it useful for superconducting magnets. The transition temperature for the intermetallic compound is 18° K. The uranium-niobium equilibrium phase diagram shown in FIG. 1 indicates low solubility of niobium in uranium below 500° C. FIG. 2 is a phase diagram for the Nb-Sn system and shows the location of the $Nb_3Sn$ ($\epsilon$) phase. FIG. 3 shows tin and uranium to be mutually insoluble at all concentrations, but does show the occurrence of one or more U-Sn compounds. When an alloy of U-6 wt.% Nb is remelted with tin the resulting mixture consists approximately of an alpha uranium phase containing essentially no niobium or tin, a gamma niobium phase containing approximately 51% Nb and no tin, and a dispersed Sn-rich phase possibly containing U and Nb (FIGS. 2 and 3). Some reaction between niobium and tin may occur during melting and casting to form the $Nb_3Sn$ intermetallic compound.

To cause formation of the $Nb_3Sn$ compound, the U-Nb-Sn cast alloy was heated into the gamma-uranium phase field (FIG. 1) where uranium and niobium are mutually soluble. Rapid cooling by water quenching from 800° C. prevents niobium diffusion and a supersaturated solid solution of niobium in uranium known as $\alpha''$ is formed. Some $Nb_3Sn$ is also formed at 800° C. and is found after cooling to room temperature. By reheating the quenched alloy to high in the alpha phase (600° C.) niobium diffusion occurs over relatively large distances, and a reaction between tin and niobium is promoted. After about four hours at 600° C. the formation of the $Nb_3Sn$ phase is essentially complete. In this experiment all heating was carried out in a molten salt bath which supplied hydrogen to the alloy. This resulted in the hydrided niobium stannide phase ($Nb_6Sn_2H_2$). By heating in other media the hydrogen could be eliminated.

We claim:

1. A method of separating niobium from a uranium-niobium alloy, comprising the steps of:
    melting tin and a uranium-niobium alloy to disperse the tin in the alloy;
    solidifying the melted tin and uranim-niobium alloy to form a billet;
    heating said billet to combine niobium with tin therein; and
    contacting said billet with hydrochloric acid to dissolve uranium in the billet in the acid and leave an insoluble material selected from the group consisting of $Nb_6Sn_2H_2$ and $Nb_6Sn_2$.

2. The method of claim 1 wherein the quantity of tin melted with said uranium-niobium alloy is in substantially stoichiometric balance with the niobium therein.

3. The method of claim 2 wherein said billet is heated to a temperature which transforms the uranium therein to the $\gamma$ phase.

4. The method of claim 3 wherein said billet is quenched in water after being heated.

5. The method of claim 4 wherein said billet is reheated after being quenched, thereby increasing the amount of niobium combined with tin therein.